United States Patent
Horn et al.

(10) Patent No.: US 8,913,807 B1
(45) Date of Patent: Dec. 16, 2014

(54) SYSTEM AND METHOD FOR DETECTING ANOMALIES IN A TISSUE IMAGED IN-VIVO

(75) Inventors: Eli Horn, Kiryat Motzkin (IL); Igor Zingman, Constance (DE)

(73) Assignee: Given Imaging Ltd., Yoqneam (IL)

( * ) Notice: Subject to any disclaimer, the term of this patent is extended or adjusted under 35 U.S.C. 154(b) by 150 days.

(21) Appl. No.: 13/340,907

(22) Filed: Dec. 30, 2011

Related U.S. Application Data

(60) Provisional application No. 61/428,243, filed on Dec. 30, 2010.

(51) Int. Cl.
*G06K 9/00* (2006.01)

(52) U.S. Cl.
USPC .......................................................... 382/128

(58) Field of Classification Search
None
See application file for complete search history.

(56) References Cited

U.S. PATENT DOCUMENTS

| 5,604,531 | A | 2/1997 | Iddan et al. |
| 7,009,634 | B2 | 3/2006 | Iddan et al. |
| 2002/0177779 | A1 | 11/2002 | Adler et al. |
| 2008/0119740 | A1* | 5/2008 | Iddan ........................ 600/477 |
| 2013/0109915 | A1* | 5/2013 | Krupnik et al. ........... 600/109 |

FOREIGN PATENT DOCUMENTS

EP 2383698 11/2011

* cited by examiner

*Primary Examiner* — Nirav G Patel
(74) *Attorney, Agent, or Firm* — Pearl Cohen Zedek Latzer Baratz LLP

(57) ABSTRACT

A system and method for detecting an anomaly in a tissue captured or imaged by an imaging system are provided. A uniform region in an image representing a tissue may be defined by identifying a group of pixels associated with a predefined variance from an imaging parameter value. An adaptive size window may be used to define a sub-region in a uniform region. An anomaly may be detected by identifying, in the sub-region, a set of pixels associated with imaging parameter values indicative of an anomaly. Other embodiments are described and claimed.

23 Claims, 8 Drawing Sheets

SYSTEM AND METHOD FOR DETECTING ANOMALIES IN A TISSUE IMAGED IN-VIVO

RELATED APPLICATION DATA

The present application claims benefit from prior U.S. provisional application 61/428,243 filed Dec. 30, 2010, incorporated by reference herein in its entirety.

FIELD OF THE INVENTION

The present invention relates to the field of anomaly detection. More specifically, the present invention relates to automatically detecting anomalies in a tissue. In particular, the present invention relates to detecting anomalies in an image of a tissue captured by an in-vivo device.

BACKGROUND OF THE INVENTION

Known devices may be helpful in providing in-vivo sensing, for example, using imaging techniques, systems and/or methods. One of the uses of such devices may involve visual detection and/or identification of objects or tissues that may be or include in-vivo anomalies (e.g., pathologies). Autonomous in-vivo sensing devices, e.g., swallowable or ingestible capsules may move through a body lumen, and sense, monitor or otherwise obtain data as they move along/through the gastrointestinal ("GI") system or other body lumens. An autonomous in-vivo sensing device may include, for example, an imager for obtaining images of a body cavity or lumen, such as the GI tract. An autonomous in-vivo sensing device may also include an optical system, a light source, a controller and optionally a transmitter and an antenna. Some of these devices transfer image data wirelessly.

Although high quality data may be produced and provided by in-vivo sensing devices, e.g., high resolution images or video streams, analyzing the data may be costly and/or time consuming. For example, identifying an anomaly in a video stream produced by an in-vivo device traveling through the GI tract may require hours since the entire video may have to be examined, possibly by a physician or trained person or healthcare professional. It would be, therefore, beneficial to detect anomalies in imaged tissues automatically. It would also be beneficial to detect anomalies in tissues adaptively; e.g., as per the unique GI system of each individual.

SUMMARY

In one embodiment, an in-vivo device may capture a color image of a tissue of the GI system, and anomalies are searched for in the image. In order to detect an anomaly in a color image of a tissue of the GI system, the color image may be segmented to valid tissue zones and to non-valid tissue zones. For example, valid tissue zones may be identified. The valid tissue zones may potentially contain anomalies and, therefore, such zones undergo anomaly detection. The non-valid tissue zones, which delimit the valid tissue zones, may be excluded from the anomaly analysis. In general, a valid tissue zone is a zone within an image whose pixels have intensities that are greater than a predetermined intensity reference and are relatively uniform; e.g., their intensities or gray levels do not change significantly across the zone, for example these pixels may have a relatively small variance in terms of intensity or gray level. Then, one or more anomaly regions may be searched for in each valid tissue zone based on a comparison between color parameters of the pixels making up the valid tissue zone and reference color characteristics. A pixel within a valid tissue zone may be categorized, or marked, as an "anomaly pixel" or as a "normal" (e.g., regular, or healthy) pixel based on the comparison result, and a region may be regarded as an "anomaly region" if the region's pixels or a group of pixels satisfy a predetermined anomaly criteria or property. The criteria may be for example, density of anomaly pixels, percentage of anomaly pixels, or other criteria. According to one example, a region may be regarded as an "anomaly region" if at least p percent (e.g., p=80%) of the region's pixels were categorized as anomaly pixels. According to another example, a region may be regarded as an "anomaly region" if the density of anomaly pixels residing within the region is greater than a predetermined an "anomaly threshold". Optionally, an additive anomaly criterion may be used, which is the region's size: a region may be regarded as anomaly region only if any other anomaly criterion is satisfied and, in addition, the region is larger than a predefined size, thus ignoring regions that may contain anomaly pixels but are too small to determine that they are anomaly regions.

In an example embodiment, the color parameters used for identifying anomaly pixels may be hue (H) and saturation (S). In an example embodiment, the reference color characteristics may factor in, or be compiled or adjusted by using a plurality of images of the imaged GI system. (The images used to adjust the reference color characteristics are not necessarily of the same person.) For example, the reference color characteristics may be obtained by counting the pixels for image #1 that have an H value h1, then the pixels for image #1 that have an H value h2, etc., then repeating the process for image #2, for image #3, etc., and respectively adding the results (e.g., h1+h1'+h1", ..., h2+h2'±h2"+, ..., etc.), thus obtaining an histogram for H. Likewise, the reference color characteristics may be obtained by counting the pixels for image #1 that have an S value S1, then the pixels for image #1 that have an S value S2, etc., then repeating the process for image #2, for image #3, etc., and respectively adding the results (e.g., S1+S1'+S1", ..., S2+S2'+S2"+, ..., etc.), thus obtaining an histogram for S. The reference color characteristics may be a combination of the H histogram and the S histogram. H values (according to certain color models, e.g. HSI color model) may be ranged, for example, between 0-360 degrees. In some embodiments, the H values may be normalizes to the range of, for example, zero to one. Other ranges may be used. In one example, anomaly pixels may be pixels whose color characteristics deviate from reference color parameters representing normal tissue.

In an example embodiment, the reference color characteristics may be universal color characteristics. In another example embodiment, the reference color characteristics may initially be universal color characteristics and then adjusted as per images captured, for example sequentially, in proximity to the tissue whose image is subjected to the anomaly analysis.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

Figure 1A:
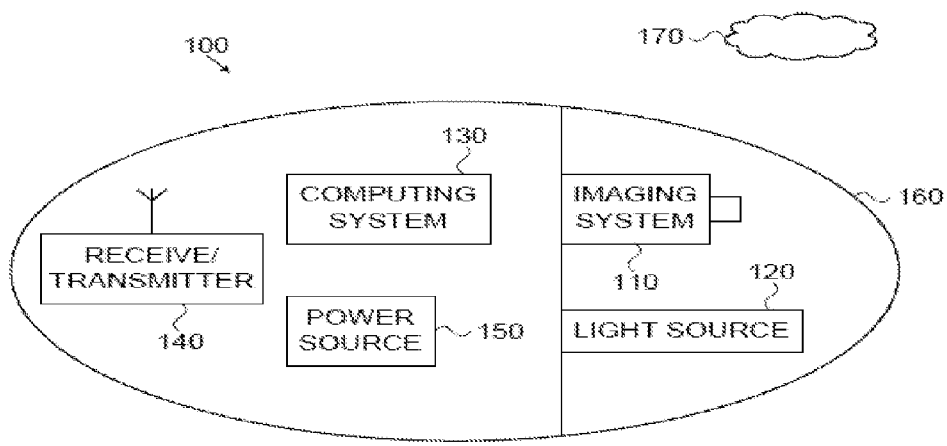
FIG. 1A is a block diagram of an in-vivo imaging system according to an example embodiment.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

Embodiments of the system and method of the present invention may be used in conjunction with an imaging system or device capable of obtaining images of in-vivo objects. More specifically, in some embodiments, any imaging device or system that may be installed in an in-vivo device as described herein may be used. However, it will be understood that embodiments of the invention are not limited by the type, nature or other relevant aspects of the imaging system, device or unit used.

An in-vivo imaging device may capture a series of images as it traverses the GI system, and transmit the images, typically by transmitting one image frame at a time. The images may be later compiled at a receiver to produce a displayable video clip. The image transmitted by the in-vivo imaging device to the receiver may be color image. In one example, each frame of image data may include 256 rows of 256 pixels each, each pixel including bytes for color and brightness, according to known methods. For example, color may be produced by using a mosaic of four pixels, where each pixel may correspond to a primary color such as red, green, or blue (where one primary color, e.g., green, may be represented twice). The brightness of a mosaic of pixels may be recorded using one byte, to enable the brightness value to be within a range of 0 to 255. Image data may be stored sequentially in a storage unit. The image data may include one or more pixel properties, including color, intensity and brightness. Any pixel's color parameter, e.g., intensity, color, hue, brightness, luminance, chromaticity and/or saturation of one or more colors may likewise be encoded and attributed to, or associated with any pixel in an image captured by an in-vivo or other device. Detection of an anomaly in a tissue imaged by an imaging device may include measuring one or more pixel's color parameters of one or more pixels in an image. An anomaly detected as described herein may be any anomaly, e.g., a polyp, a lesion, a tumor, an ulcer, a blood spot, an angiodysplasia, a cyst, a choristoma, a hamartoma, a tissue malformation and a nodule.

FIG. 1A shows a schematic diagram of an in-vivo imaging device 100 according to an example embodiment. In-vivo imaging device 100 may include an imaging system 110, a light source 120, a computing system 130, a receiver/transmitter 140, a power source 150 (e.g., an internal battery or a wireless energy picking system) and a viewing window or dome 160. In some embodiments, in-vivo imaging device 100 may be, for example, a swallowable capsule capable of capturing images and/or obtain other data. More specifically, in-vivo device 100 may independently obtain images, process images, store images and other information, communicate images to a remote computing or communication device and/ or provide information, data or parameters related to obtained and/or processed images. For example, while inside a body of a human or other mammal, in-vivo device 100 may obtain images of tissues, objects or its surroundings, store, process and communicate the obtained images as well as calculate, compute, determine and provide various indications, alarms, results or measurements.

In-vivo device 100 may have a shape of a capsule, as demonstrated in FIG. 1A, including for example a viewing window or dome 160. Viewing window 160 may be convex or substantially convex and smooth, and may project outward from the main body and/or housing of device 110. Viewing window 160 may be designed to provide a suitable field of view (FOV) for imaging system 110 and/or to enable light from light source 120 to reach objects or tissues outside device 110, e.g., tissue 170 as shown. Other shapes may be used, and the device need not be swallowable or a capsule. For example, device 100 may be implanted, inserted or otherwise located in any applicable location.

Imaging system 110 may be any suitable imaging system. For example, imaging system 110 may include any number of lenses or mirrors, or support assemblies that may be used to direct imaging system 110 at a specific direction or angle and/or an embedded control module. Imaging system 110 may include a complementary metal oxide semiconductor (CMOS) imaging camera. As known in the art, a CMOS imager is typically an ultra low power imager and is provided in chip scale packaging (CSP). Other types of CMOS or other imagers may be used, e.g., a CCD imager. A 320×320 pixel imager may be included in imaging system 110, e.g., one having pixel size between 5 to 6 microns. According to some embodiments pixels may be each fitted with a micro lens. Light source 120 may be any suitable light or energy source capable of producing, e.g., periodically or continually, light or other form of energy that may interact with tissues or objects outside device 100, e.g., tissue 170 shown in FIG. 1A. For example, light emitted periodically or continually by light source 120 may be reflected from the objects and captured by imaging system 110. For example, light source 120 may be a set of light emitting diodes (LEDs), organic LEDs (OLEDs), or other suitable light sources, may provide light to illuminate objects thus enable acquiring images as known in the art. In other embodiments, other forms of energy or types of light may be produced by light source 120, e.g., any form light or energy that imaging system 110 is capable of acquiring.

Computing system 130 may be any suitable article, processor, chip, controller or suitable computing device suitable for processing images as described herein as well as controlling components in device 100. For example, computing system 130 may perform one or more of: causing imaging system 110 to acquire an image, process the image, cause the image to be stored on a local storage (not shown) in device 100, cause the image to be communicated to a remote device, e.g., by controlling transmitter/receiver 140 and the like. In some embodiments, computing system 130 need not be a separate component; for example, parts of computing system 130 may be integral to, or embedded in, imaging system 110 or receiver transmitter 140. The functionality of computing system 130 may be performed by other components of device 100.

Transmitter/receiver 140 may transmit and/or receive images and/or other (e.g., non-image) information to/from a remote device. For example, a computer configured to wirelessly communicate with device 100 may be placed near a patient and may wirelessly communicate with device 100. Transmitter/receiver 140 may be an ultra low power radio frequency (RF) transmitter with high bandwidth input, possibly provided in chip scale packaging, may be combined with a processing chip or circuit and may transmit and/or receive information via an antenna as shown. Device 100 may include a power source 150, such as one or more batteries. For example, power source 150 may include silver oxide batteries, lithium batteries, or other electrochemical cells having a high energy density, or the like. Other power sources may be used. Other components, modules or units may be used. For example, power source 150 may be capable of receiving power from an external power source transmitting power to the device 100.

Embodiments of device 100 may typically be autonomous and/or self-contained. For example, the device may be a capsule or other unit where components are substantially contained within a container or shell, and where the device does not require any wires or cables to, for example, receive power, obtain, store or transmit information etc. Device 100 may communicate with an external computing or communication system that may receive, process, store, communicate and display images or other data or information received from device 100. The remote system or device may further be used to control device 100. Accordingly, it will be understood that processing of digital images and detecting anomalies in a tissue captured in images as described herein may be performed by a remote computing system configured to receive images acquired by in-vivo device 100.

In some embodiments, some or all of the processing of images as described herein may be performed by device 100, e.g., using computing system 130. In other embodiments, device 100 may perform some of the processing described herein and another computing system, e.g., a remote system may perform other processing or tasks. In yet other embodiments, device 100 may only obtain images, perform limited or no processing of the acquired images and send the images to a remote computing device or system which may perform processing, analyzing and determining of various parameters based on received images. For example, a, remote system may display images to a physician, receive a selection from the physician and detect an anomaly in a tissue shown in an image based on the physician's selection.

Figure 1B:
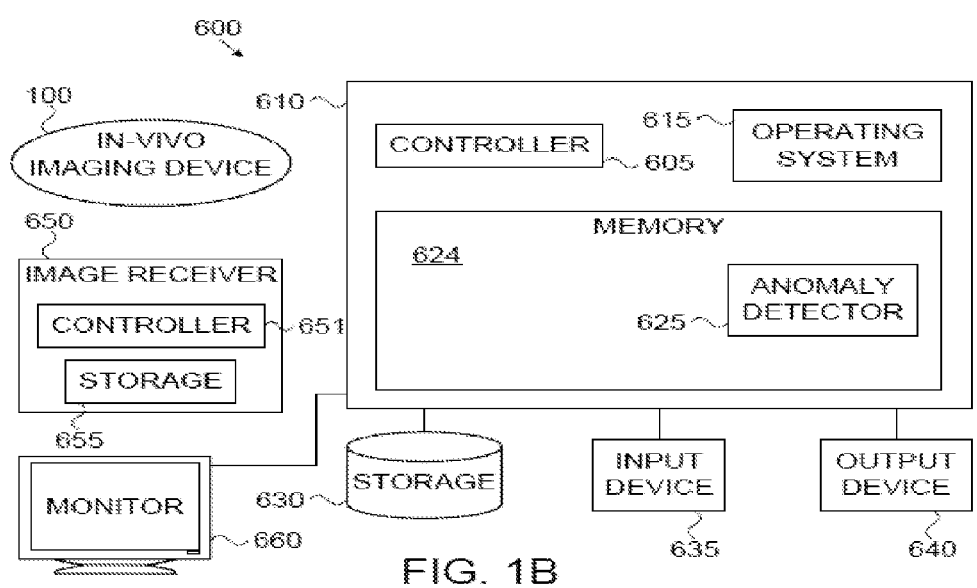
FIG. 1B is a block diagram of an in-vivo imaging system according to an example embodiment.

FIG. 1B that shows a schematic illustration of an in-vivo imaging system 600, according to an example embodiment. System 600 may include an in-vivo imaging device, for example, an in-vivo imaging device 100. In-vivo imaging device 100 may communicate with an external receiving and display system to provide display of data, control, or other functions. System 600 may include a receiver 650 including processor or controller 651, for example to receive images from in-vivo imaging device 100, and a storage 655. For brevity, various components that may be installed or included in image receiver 650 are not shown. For example, image receiver 650 may include output and input ("I/O") components, interface, or devices, which may be similar to input device 635, and an output device 640 and/or an operating system similar to operating system 615, memory similar to memory 624, etc. Image receiver 650 may be any suitable computing device that may perform any function, process or operation that is related to the detection of anomalies or pathologies in images, as described herein.

Image receiver 650, which may include an antenna or antenna array, an image receiver storage unit 655 and a data processor or controller, may be a small device that can be worn and carried by a patient. For example, an (e.g. ambulatory) patient may wear image receiver 650 on a belt or wrist. Image receiver 650 may communicate, e.g., wirelessly, with in-vivo device 100, receive, from in-vivo device 100, images and store received images on storage 655. Image receiver 650 may collect images captured by in-vivo imaging device 100 over a relatively long period of time. Image receiver 650 may be configured to communicate, wirelessly or otherwise, with computing system 610 and transfer images and/or other information to computing system 610. For example, images and/or other information received from in-vivo imaging device 100 may be stored on storage 655 and may be transferred from storage 655 to computing system 610, e.g., using wireless communication, a universal serial bus (USB) connection or another communication method.

Computing system 610 may analyze and/or process images captured by in-vivo device 100 to detect anomalies (among other things). Computing system 610 may receive images directly from in-vivo device 100 or via image receiver 650, and may detect anomalies in tissues imaged by in-vivo device 100. Various operations and tasks that may be performed by computing system 610 may be performed by in-vivo imaging device 100, e.g., by computing system 130 or, in other embodiments, by image receiver 650.

System 610, which may be a workstation, may store an image captured by in-vivo imaging device 100 in memory 624, and the processor/controller 605 may be configured to select image pixels associated with the imaged object, analyze pixel color parameters of the selected pixels, and perform various calculations related to the pixels and/or associated parameters. For example, controller 605 may mark a pixel as an "anomaly pixel" based on pixel color parameters values of the pixel. Controller 605 may execute software or code to, for example, define a region in an image, identify edges or borders of the region, apply a distance transform function to pixels within the region to produce a value related to the distances of the pixels from edges of the region, adapt a window to the region and to detect an anomaly in the region by detecting a high density of marked pixels (e.g., anomaly pixels) in the adapted window.

Selection of pixels and performing tasks, processes and functions described herein may be performed by controller 651, or by controller 605, or by both controllers 651 and 605. In some embodiments, the task of detecting an anomaly in an imaged object or imaged tissue may be distributed among controllers, processors or computing systems. For example, computing system 130 and controllers 605 and 651 may share computational tasks or calculations in order to detect an anomaly tissue/organ in an image. Computing system 130 and controllers 605 and 651 may communicate or exchange (e.g., over wireless or wired links) any data, parameters or information. Computing system 130 and controllers 605 and 651 may share efforts and computational resources in performing any relevant tasks or methods described herein. In some embodiments, processing of images performed in order to detect anomalies or pathologies may be distributed. For example, an image may be modified by computing system 130 in in-vivo device 100, e.g., values associated with pixels may be altered based on parameters which may be device specific, e.g., a lens, a light source etc. The pre-processed image may then be communicated to system 610 which may detect anomalies or pathologies in imaged tissues. Computing system 610 may include a controller 605 that may be, for example, a central processing unit processor (CPU), a chip or any suitable computing or computational device, an operating system 615, a memory 624, a storage 630, an input device 635 and an output device 640. Operating system 615 may be or may include any code segment designed and/or configured to perform tasks involving coordination, scheduling, arbitration, supervising, controlling or otherwise managing the operation of computing system 610, for example, scheduling execution of programs loaded into memory 624. Anomaly detector 625 may be any executable code, e.g., an application, a program, a process, task or script. Anomaly detector 625 may be executed by controller 605 possibly under control of operating system 615. For example, anomaly detector 625 may be an application designed to analyze an image and detect anomalies or pathologies in an imaged object (e.g., a GI tissue). Storage 630 may be or may include, for example, a hard disk drive, a floppy disk drive, a Compact Disk (CD) drive, a CD-Recordable (CD-R) drive, a universal serial bus (USB) device or other suitable removable and/or fixed storage unit. Input device 635 may be or may include a mouse, a point-and-click device, a keyboard, a touch screen or pad or any suitable input device. In some embodiments, input device 635 may be an input port. For example, an input port (e.g., a network interface card (NIC), a USB port or a wireless port or card) may be used to receive images from image recorder 650, in-vivo device 100, or an external storage. It will be recognized that any suitable number of input devices may be operatively connected to computing system 610. Output device 640 may include one or more displays, speakers and/or any other suitable output device. It will be recognized that any suitable number of output devices may be operatively connected to computing system 610. Any suitable input/output (I/O) device may be connected to, and used to interact with, computing system 610.

Images obtained by in-vivo device 100 and provided to computing system 610 may be displayed on monitor 660. Any result or indication may be displayed on monitor 660. For example, an anomaly may be displayed on monitor 660 by displaying the image containing the anomaly, and superimposing a visual indication on the anomaly. Input device 635 (e.g., a mouse) may be used by a user to indicate objects, tissues or regions of interest in an image, and an anomaly may be searched for and/or detected in an indicated area or portion of that image. A tissue or a tissue portion or region where an anomaly may be searched for and/or detected may be selected based on an indication of interest received from a user. For example, a user may click or otherwise indicate (e.g., using a pointing device such as a mouse, a stylus, etc.) a location in an image, circle a location or otherwise indicate a tissue, organ or region of interest, and an anomaly in the selected or indicated area, tissue or organ imaged by the in-vivo device may be performed as described herein. Some functions or tasks that are performed by anomaly detector 625 may be implemented in hardware (e.g., by using an application-specific integrated circuit (ASIC) or chip), or they may be implemented in firmware.

A physician may use system 600 to indicate or mark an object of interest and/or indicate or mark a particular area in a displayed image for anomaly analysis. For example, the physician may observe an image of tissue 170 (tissue 170 is shown in FIG. 1A) and use, for example, input device 635 to point or mark a region or area of interest (e.g., a region or area suspected as being anomaly), and the marked region or area, or the region/area pointed to, may be analyzed and an anomaly (if exists) may be automatically detected in the indicated/marked region/area. An area suspected as having an anomaly may be selected automatically, e.g., based on various attributes (e.g., color parameters) such as color, hue, saturation, or reflected light intensity that may significantly differ from attributes of the surrounding environment, e.g., adjacent or nearby tissue. Detection of anomalies in the colon and small bowl may be of particular interest. But it may likewise be applicable to other organs or tissues.

An anomaly in a tissue may exhibit, or be associated with, traits such as a specific color or other specific values that may be detected by examining pixel color parameters of pixels in an image. For example, anomalies such as a polyp, a lesion, a tumor, a blood spot, an angiodysplasia, a cyst, a choristoma, a hamartoma, a tissue malformation or a nodule may be characterized by having a color, saturation, intensity or other color parameters that may differ from those associated with, or be conspicuous relative to, a normal/healthy tissue.

Figure 2:
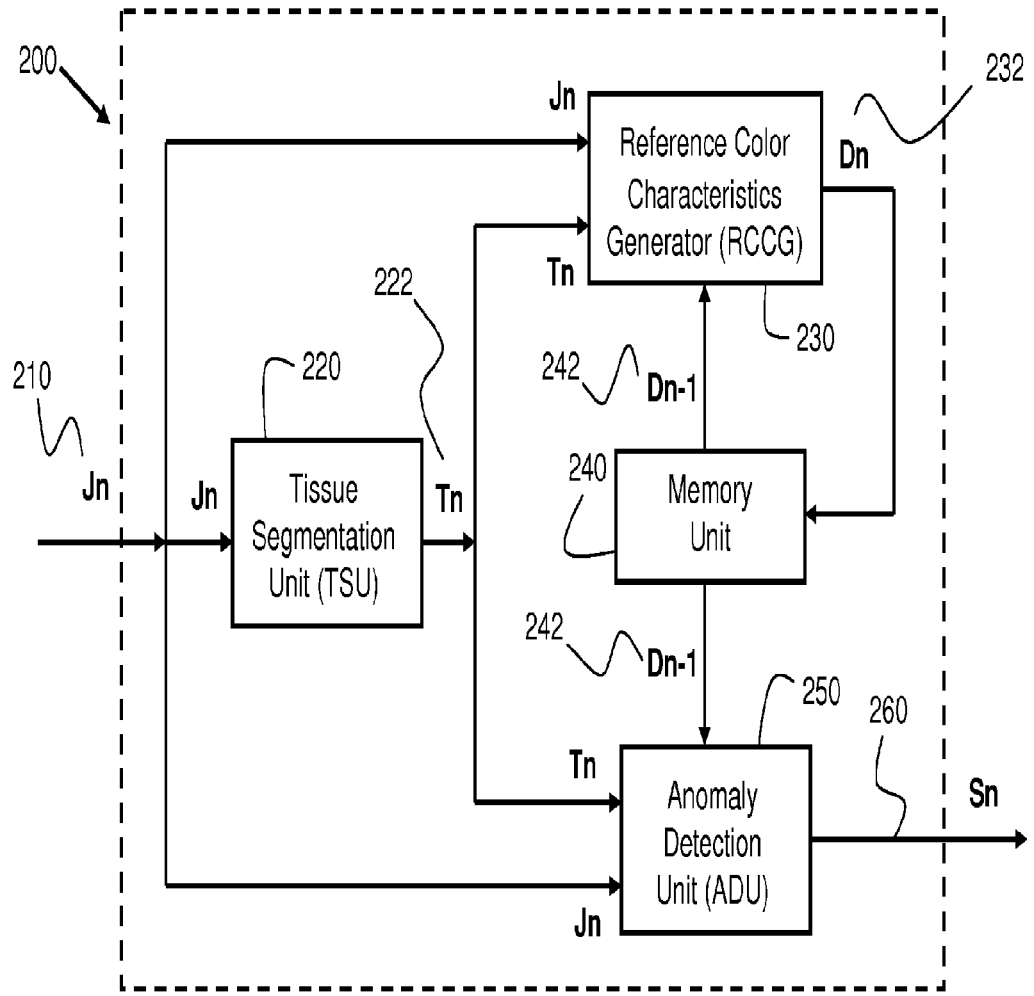
FIG. 2 is a block diagram of an anomaly detector system according to an example embodiment.

FIG. 2 shows a schematic illustration of an anomaly detector 200 according to an example embodiment. Anomaly detector 200 receives an image Jn as input (image Jn, or image frame Jn, shown at 210), and outputs an anomaly decision or result Sn (anomaly decision Sn is shown at 260). Anomaly decision or result Sn may be or include, for example, a message or an indication regarding an identifier of an image within which one or more anomaly regions were detected, and the location and size of each of the detected anomaly regions (that is, if more than one such region was detected). The anomaly decision or result Sn may alternatively or additionally be used to display the image with anomaly region(s), and have the anomaly region(s) marked or accentuated, or otherwise indicated or introduced. Anomaly detector 200 may receive an image frame Jn and use an image extractor to extract image Jn. Assume that anomaly detector 200 receives an image Jn rather than an image frame. Depending on the context, n in FIG. 2 may denote an image n that undergoes an anomaly detection process, or reference color characteristics that are produced by using n images (or n image frames).

Anomaly detector 200 may include a tissue segmentation unit ("TSU") 220 for segmenting image Jn to filter out tissue zones of low interest (e.g., edges, wrinkles, shadows, etc.), thus 'isolating' or identifying tissue zones whose anomalies (if they exist) are readily searchable. TSU 220 may use the intensity/gray values of the image pixels to perform a binary (e.g., valid tissue zones versus non valid tissue zones) segmentation of the image, in order to neutralize or mitigate the effect of colors of the tissues, which are typically varying hues of red color, on the segmentation result in order, for example, to obtain as genuine delimiters or boundaries as possible. (The delimiters or boundaries delimit the tissue zones, thus isolating these zones.)

Anomaly detector 200 may also include a reference color characteristics generator ("RCCG") 230 for producing reference color characteristics Dn (Dn is shown at 232). Reference color characteristics Dn may facilitate color-based detection of deviant color pixels. By "deviant color pixel" may be meant, for example, a pixel whose color hue (H) deviates from a reference hue (Hr), which is an example reference color characteristics Dn. A deviant color pixel may indicate an abnormal or unhealthy tissue. For example, since healthy tissues are typically reddish, a significantly redder portion of a tissue may be regarded as, and therefore indicate an, unusual (e.g., unhealthy or anomaly) tissue. Anomaly detector 200 may also include a memory unit 240 for storing the reference color characteristics Dn produced by RCCG 230, one or more images and/or other intermediate calculation results and data, and an anomaly detection unit ("ADU") 250 for detecting one or more anomalies (e.g., anomaly regions) in image Jn. TSU 220, RCCG 230, and ADU 250 and other units discussed herein may be implemented in software, hardware, firmware or in any combination thereof. For example, any of these units may be implemented as software modules executed on a (possibly specifically designed and configured) computing device (e.g., shown in FIG. 1, or another system) or it may be or include one or more application specific integrated circuits (ASIC), a chip comprising firmware or a hardware component, device or system.

Image Jn may be one of many images in a video stream originated from in-vivo device 100. Image Jn may be provided to anomaly detector 200 as part of a series of sequential images, or it may be provided to anomaly detector 200 selectively, as per a selection provided by a user, for example, by using input device 635.

Anomalies may be characterized by having a color that is redder (e.g., pixels representing or imaging an anomaly, or 'anomaly pixels', as they are referred to herein, may generally have lower H values relative to pixels representing or imaging healthy background tissues. For example, on the average, pixels imaging anomalies generally have lower red hues than pixels imaging normal/healthy tissues. Therefore, an anomaly may be detected by identifying a background tissue and, then, identifying regions in the background tissue that are redder than the background tissue. The background tissues (which are referred to herein as "valid tissue zones") may be identified or detected by performing a gray level based segmentation process by, for example, TSU 220. (Since color-based segmentation of an image (e.g., of image Jn) may distort the genuine delimiters/boundaries of the background tissues, the segmentation is performed based on gray values of pixels, as discussed above). Other pixel values may be detected, for example, an ulcer may have a typically whitish or yellowish zone.

Therefore, in order to detect an anomaly in image Jn (which is a color picture of a tissue/organ of the GI system), TSU 220 segments image Jn to valid tissue zones and to non-valid tissue zones. The non-valid tissue zones, which are zones circumscribing or delimiting valid tissue zones, are excluded from the anomaly analysis because non-valid tissue zones are assumed to originate from, or represent, boundary lines, edges, shadows, wrinkles, etc. Valid tissue zones are characterized by their pixels introducing higher gray levels relative to the gray levels introduced by the non-valid tissue zones' pixels, and by having small changes in their gray levels; e.g., the gray level of a valid tissue zones does not change much across the zone. In general, a valid tissue zones is a zone whose pixels have intensity levels that are higher than a predetermined intensity reference and relatively uniform; e.g., their intensities do not change significantly across the zone (e.g., these pixels may have a relatively small variance in terms of their intensity levels). Since valid tissue zones represent background tissues, these zones may potentially contain anomalies and, therefore, it would be beneficial to have them analyzed anomaly wise in the way described below.

After the valid tissue zones are determined (e.g., by TSU 220), one or more anomaly regions may be searched for in each such zone based on a comparison between pixel color parameters (e.g., hue, saturation, intensity, etc.) of the pixels making up the valid tissue zone and reference color characteristics Dn−1. The reference color characteristics may be fixed or adjustable, as described below. A pixel within a valid tissue zone may be categorized or classified (e.g., by ADU 250) as an 'anomaly pixel' or as a 'normal' (e.g., regular, or healthy) pixel based on the comparison, and a region within a valid tissue zone may be regarded as an 'anomaly region' if, for example, at least a predefined percentage of the region's pixels (e.g., at least 80% of the region's pixels) have been categorized as anomaly pixels. Optionally, a region may be regarded as an anomaly region if it satisfies the latter condition (e.g., more than a predefined percentage of the region's pixels are anomaly pixels) and, in addition, the region is larger than a predefined size.

In the example shown in FIG. 2, TSU segments a currently received image Jn, and outputs a corresponding binary image Tn (shown at 222) that contains valid tissue zones and non-valid tissue zones. RCCG 230 retrieves, from memory unit 240, the reference color characteristics Dn−1 (shown at 242) that was stored last, and analyzes the color content of image Jn to update, or adjust, the reference color characteristics Dn−1. The result of the reference color characteristics update/adjustment is reference color characteristics Dn (shown at 232). As discussed above, only the color pixels corresponding to the valid tissue zones are of interest (e.g., searchable for anomalies). Therefore, RCCG 230 uses the segmented image Tn to filter out the color pixels of image Jn that do not correspond to the valid tissue zone, thus factoring in (in the reference update/adjustment process) only color pixels of interest. Then, the updated, or adjusted, reference color characteristics Dn are stored in memory unit 240 in order for them to be used with the next image (e.g., image Jn+1). ADU uses reference color characteristics Dn−1 to detect anomalies, or anomaly regions, in the color image Jn after it masks image Jn with segmented image Tn. When anomaly detector 200 finishes analyzing the image Jn, it outputs the analysis result Sn (e.g., number and/or location and/or size of anomalies, display of the anomalies, etc.). Using Dn−1 by ADU 250 to detect anomalies in image Jn and, substantially at the same time, updating Dn−1 by RCCG 230 may save computation time. Alternatively, ADU 250 may detect anomalies in image Jn only after RCCG 230 computes Dn and stores it in memory unit 240. The process described in connection with image Jn may repeat for other color images.

Although a single image Jn is shown, it will be understood that any number of images may be provided to anomaly detector 200. For example, a series, set or stream of images (or image frames) may be provided. System 200 may process a stream of images included in a video captured by in-vivo device 100 in vivo. RCCG 230 may calculate various statistical parameters (related to, for example, color characteristics) such as a range of imaging parameter values that may be used in order to determine whether a pixel is to be marked as associated with an anomaly (e.g., whether the pixel is an anomaly pixel), e.g., by comparing a pixel parameter value to a reference value that may be statistically determined by RCCG 230. For example, RCCG 230 may examine a large number of values (e.g., related to color characteristics) associated with pixels in a large number of images, and statistically determine a range of values (e.g., for the color characteristics) that may represent or characterize normal tissues.

An appearance, distribution of colors or color hues, intensities or other features or color parameters or characteristics related to a tissue may automatically be learned, mapped and/or determined, for example by RCCG 230, for example for computing reference color characteristics. For example, images making up a video stream may be analyzed, and various imaging parameters (e.g., color characteristics), their values or other attributes, may be charted, mapped or otherwise represented. Although for the sake of clarity and simplicity the discussion herein mainly refers to hue and saturation values, it will be understood that other imaging parameters, e.g., intensity, brightness, luminance and/or chromaticity may likewise be used in detecting an anomaly, and that processing, as described herein in connection with hue and saturation may likewise be applied to other imaging parameters.

In one example, hue and saturation values of multiple images may be examined, and two 1-dimensional graphs or histograms (e.g., one histogram for the hue values and another histogram for the saturation values) may be produced, for example by RCCG 230. The hue histogram may express an average distribution of hues across multiple images, and the saturation may express an average distribution of saturation values across the same images. RCCG 230 may 'learn' the color specifics of an imaged GI tract as it receives and analyzes a series of color images, and update the hue and saturation histograms accordingly to converge them to distributions that statistically represent healthy tissues of the particular imaged GI tract. The two histograms may serve as the reference color characteristics mentioned herein, to which color pixels may be compared in order to determine whether the color pixels are anomaly pixels or not.

An anomaly result, Sn (shown at 260), may be produced: for example, images marked as including possible anomalies may be displayed to a user or otherwise be provided to a user, for example graphically or visually, for example on display screen 660. For example, a circle, window, or arrow may indicate an anomaly detected as described herein. An anomaly result may further be automatically stored (for example in memory 624), e.g., in order to track changes in future treatments or examinations of the patient. An anomaly result may be a decision, e.g., that an anomaly was detected. Generally, result 260 may be any output of system 200, e.g., a decision, indication, alarm, or any other data or information.

An anomaly result may be an audible indication, e.g., a audible warning. An anomaly result may be automatically communicated over a network. For example, system 200 may communicate an anomaly result to a remote computing device.

Figure 3:
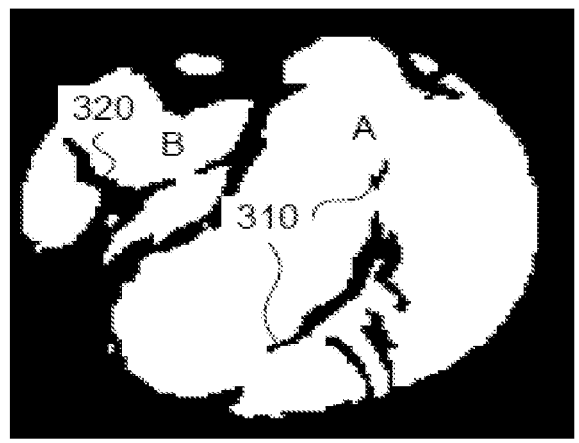
FIG. 3 shows an example result of a segmentation process according to an example embodiment.

FIG. 3 shows exemplary valid tissue zones "A" and "B" and exemplary edges 310 of valid tissue zone "A" and an exemplary edge 320 of valid tissue zone "B" as may be detected or identified by TSU 220, e.g., as described herein. The valid tissue zones are shown as the white areas in FIG. 3. Anomalies may be searched for and detected in valid tissue zones A and B that may be delimited by edges such as edges 310 and 320. Anomalies may not be searched for or detected in edges 310 and 320 or in any portion other than in zones A and B.

Figure 4:
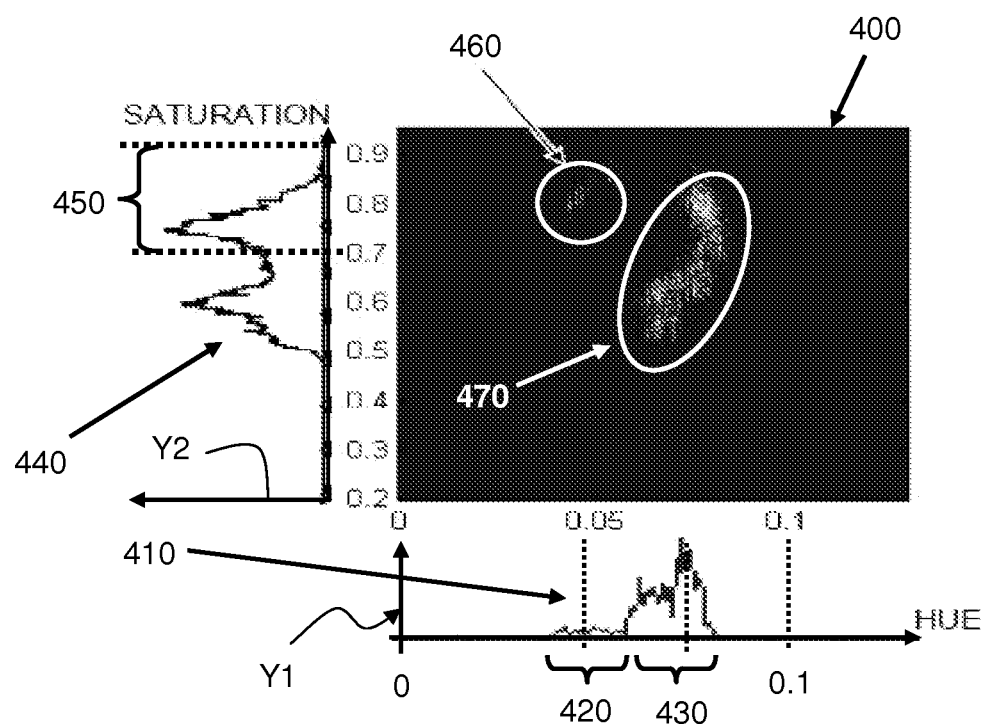
FIG. 4 graphically shows an exemplary distribution of color parameters according to an example embodiment.

FIG. 4 shows a hue graph 410 and saturation graph 440 according to an example embodiment. By way of example, hue histogram 410 represents an average distribution of red hues (Hs) of multiple images, and has a range of 0.0 to 0.1. Other ranges of hues may be used, which may depend on the particular GI system that is imaged and color-wise analyzed. The closer H is to the zero value, the redder is the color of the pixel. As explained above, anomaly tissues may be characterized by having a red color that is redder than the red color of their background tissues. Therefore, if, for example, a pixel has a hue value in the example H range 420, the pixel may be regarded as anomaly pixel. In contrast, if a pixel has a hue value in the example H range 430, the pixel may be regarded as a normal or healthy pixel. The y-axis of the H histogram (e.g., axis Y1) may denote an average number of pixels per hue value.

By way of example, saturation histogram 440 represents an average distribution of the saturations (Ss) of multiple images, and has a range of 0.2 to 0.9. Other ranges of saturations may be used, which may depend on the particular GI system that is imaged and color-wise analyzed. The higher the S value of a pixel, the higher the probability that the pixel represents or images an anomaly. By way of example, it may be determined that a pixel having an S value in range 450 may be regarded as anomaly pixel. The y-axis of the S histogram (e.g., axis Y2) may denote an average number of pixels per S value.

In one embodiment, a group or cluster of anomaly pixels may be identified, for example within a valid tissue zone. If the group or region of anomaly pixels satisfies predetermined criteria or property, it may be determined that the region containing the group of anomaly pixels has an anomaly.

A determination (e.g., by ADU 250), regarding whether a group of pixels whose colors represent a currently analyzed image, may be done based on graph/histogram 410, or based on graph/histogram 440, or based on both graphs/histograms. Assume that image 400 is an image to be analyzed by comparing its color content to histograms 410 and 440. The result of the comparison process would identify anomaly pixels in image 400. For example, pixel group 460 may be identified as representing an anomaly because each pixel in that group has an H value within H range 420 and an S value within S range 450 (in this example, value ranges 420 and 450 are typical to unhealthy tissues). In contrast (to continue the example), pixel group 470 may be identified as representing a healthy tissue because each pixel in pixel group 470 has an H value within H range 430 and S values below S range 450 (in this example, value range 420 and S values below range 450 are typical to healthy tissues).

Using an H histogram and an S histogram to identify anomaly pixels is more fully described below in connection with FIG. 5. Assuming that image 400 is image n, it may be analyzed and its anomaly pixels identified, by using histograms 410 and 440 that represent average color characteristics of n−1 images. The color content of image 400 may be analyzed and used to update the H histogram and the S histogram, and the updated histograms may be used to detect anomaly pixels in the next (e.g., $(n+1)^{th}$) image. The process including an on-going updating of the histograms (e.g., by RCCG 230) is referred to herein as "learning". RCCG 230 may update the histograms, or Dn for that matter, by using, for example, formula (1), $$D_n = a \cdot D_{n-1} + F_n \qquad (1)$$

where $D_{n-1}$ may denote histograms such as histograms 410 and 440, that were calculated by using n−1 previously analyzed images, $F_n$ denotes the color content of a currently analyzed image, and a is a constant 'weight' smaller than one (a<1) that determines the effect that previous images have on $D_n$. In general, the more remote is a tissue from a currently examined tissue, the lesser is its effect/weight. Using a as weight in formula (3), therefore, ensures that Dn is affected by the color content of remote tissues to a lesser extent than by the color content of tissues that are closer to the currently examined (e.g., imaged, analyzed, etc.) tissue. Other 'learning' formulas may be used instead of formula (3).

Figure 5:
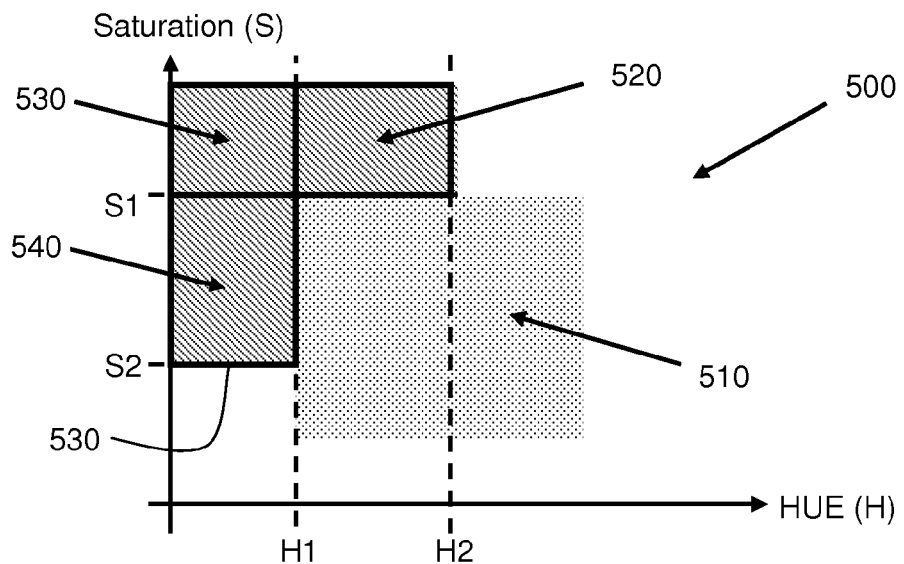
FIG. 5 schematically shows an exemplary directive H-S map according to an example embodiment.

FIG. 5 shows an exemplary H-S directive map 500 for determining, for example by ADU 250, whether a particular pixel is an anomaly pixel according to an example embodiment. In H-S map 500, reference numeral 510 denotes an H-S region that is characterized by having a range of hue and intensity values that represent, or characterize, normal (e.g., healthy) tissues. H-S region 510 may, with high probability, be attributed to healthy tissues because every point (e.g., related or resenting a particular pixel) has a 'healthy' H value (e.g., an H value higher than H1), and a 'healthy' S value (e.g., an S value lower than S1). Reference numeral 520 denotes an H-S region that is characterized by having a range of 'healthy' hue values (e.g., H values that represent, or characterize, normal (e.g., healthy) tissues), and a range of 'unhealthy' S values (e.g., S values that represent, or characterize, anomaly (e.g., unhealthy) tissues). H-S region 520 may be attributed to healthy tissues because of its healthy H range (e.g., H values greater than H1), but it might as well be attributed to unhealthy tissues due to its unhealthy S range (e.g., S values greater than S1). Reference numeral 530 denotes an H-S region that is characterized by having a range of unhealthy hue values (e.g., H values lower than H1) and a range of unhealthy S values (e.g., S values greater than S1). H-S region 530 may be attributed only to unhealthy tissues because of its unhealthy H range and its unhealthy S range. Reference numeral 540 denotes an H-S region that is characterized by having a range of unhealthy hue values (e.g., H values lower than H1) and a range of healthy S values (e.g., S values lower than S1). H-S region 540 may be attributed to unhealthy tissues because of its unhealthy H range, but it might as well be attributed to healthy tissues due to its healthy S range.

A pixel whose H-S values reside in H-S region 510 would not be marked as anomaly pixel. In contrast, a pixel whose H-S values reside in H-S region 530 would be marked as an anomaly pixel. A pixel whose H-S values reside in H-S region 520 may be marked as an anomaly pixel because of its unhealthy S value, and a pixel whose H-S values reside in H-S region 540 may be marked as an anomaly pixel because of its unhealthy H value. ADU 250 may use H-S map 500, or a similar map to detect pixels that may be associated with an anomaly as described herein.

A reference range of hue values and a reference range of saturation values may be defined or computed, and pixels whose H,S values fall outside the range may be marked as representing an anomaly, or suspected as representing an anomaly. For example, and as shown, a range of saturation values from S2 to S1 and a range of hue values from H1 to H2 may be defined (e.g., by a user or ADU 250). By way of example, pixels whose H,S values meet the condition (H<H1 and S>S2) or the condition (H<H2 and S>S1) may be identified as potentially representing an anomaly and marked accordingly.

The reference values H1, H2, S1 and S2 may be determined using any applicable method or formula, or empirically. The H,S reference values may be fixed, or they may be variable. Alternatively, the H,S reference values may be adjusted intermittently, once in a while, every predetermined time interval, or as per another criterion. For example, the H,S reference values may be adjusted concurrently with the adjustment of the reference color characteristics (e.g., with each computation of Dn), for example concurrently with the adjustment of the H-S histograms.

Reference Hi and Si values may be adaptively determined adaptively from distributions $D_h$ and $D_s$ by calculating an area under the distributions $D_h$ and $D_s$ and finding a value for Hi and Si such that the resulting area would be smaller than or about a predetermined threshold value. Hi and Si may be calculated, for example, by using the set of formulas (2):

$$F(h) = \sum_{x=0}^{h} D_H(x) \qquad F(s) = \sum_{x=0}^{s} D_S(1-x) \qquad (2)$$
$$H_i = \arg\min_{F(h) \geq Ph_i} \qquad S_i = 1 - \arg\min_{F(h) \geq Ps_i} F(s)$$

where distributions $D_h$ and $D_s$ are, respectively, hue and saturation distributions that are computed as described herein (e.g., by RCCG 230), and $P_h$ and $P_s$ are predefined probabilities. Other formulas may be used to adjust reference values H1, H2, S1 and S2.

The center of an adaptive widow may be selected by calculating a distance transform function value for some or all pixels in a uniform region. A distance transform function may produce a value representing the distances of a pixel from the edges of a uniform region in which it is included. A value related to one or more distances of the pixel from surrounding edges may be recorded, e.g., as a single value, in association with the pixel. In a particular embodiment, a value associated with a pixel by the distance transform function may be or may represent the minimal or shortest distance of the pixel's location to the location of the nearest edge or border of the region with which the pixel is associated. One or more maximums of the values produced by applying the distance transform function to a set of pixels (e.g., a set in a uniform region) may be detected. A maximum in a set of values produced by the distance transform function may indicate a pixel that is farther from edges of the region as compared to neighboring pixels. A location of a center of an adaptive size window may be chosen such that it coincides with, or based on, the location of a pixel associated with maxima described above. Based on recoded distances of the pixel from the edges of the region, the size, shape and orientation of the adaptive size window may be determined such that it includes a maximal portion of the uniform region. Accordingly, the distances of edges from a pixel may be recorded and used for determining the size, shape, orientation or other parameters of an adaptive window that may be centered around the pixel.

In one embodiment, if a group, region or cluster of anomaly pixels satisfies predetermined criteria or property, it may be determined that the region containing the group of anomaly pixels has an anomaly.

Upon determining a size, location or other attributes of an adaptive window in a region, the number of marked pixels (e.g., marked as associated with values indicative of an anomaly) may be examined or calculated. It will be understood that a number of criteria or properties may be applied to a respective number of values. If the pixels satisfied a predetermined criteria or properties, for example the number of pixels marked as described herein exceeds a threshold value, it may be determined that the widow (or an associated area, e.g., covered by, or associated with, the adaptive size window) is associated with an anomaly, or that an anomaly has been detected in an area associated with the window. The number or location of the frame may be recorded, a time stamp may be recorded or any other method to enable indicating the frame to a user or enable a user to easily observe the image on a display screen may be used. When the image frame is displayed to a user, the adaptive size window may be shown, e.g., in order to draw an attention of a user to a detected anomaly. Any indication, information or parameters related to a detection of anomalies may be displayed to a user on a display screen.

Figure 6:
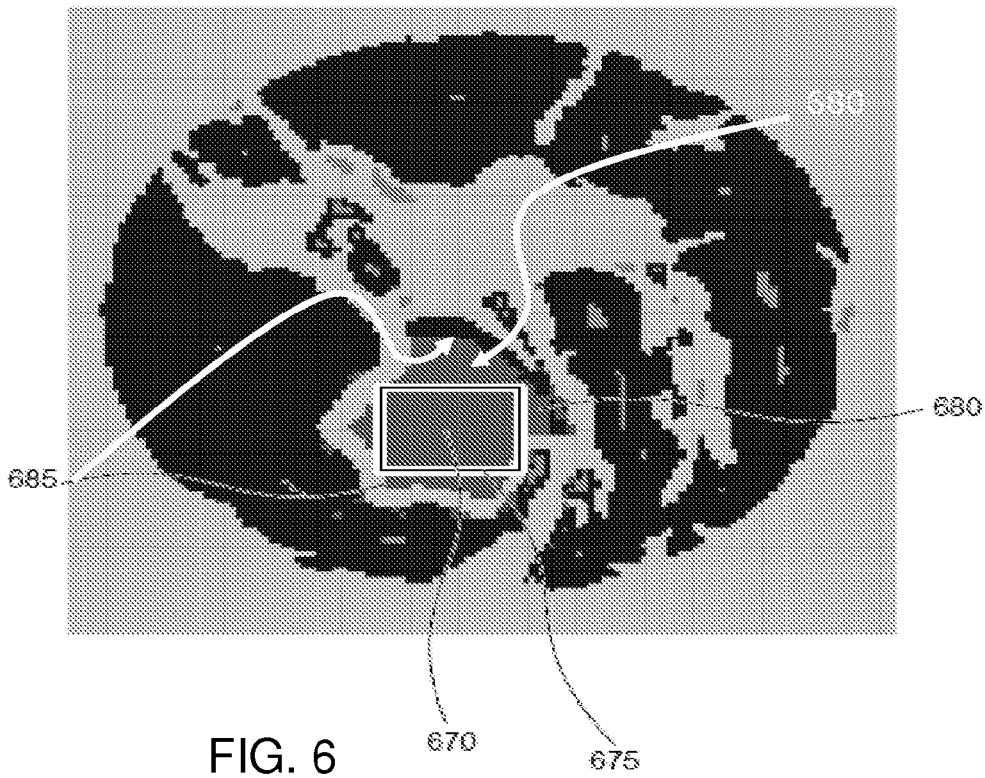
FIG. 6 shows an exemplary adaptive size window according to an example embodiment.

FIG. 6 shows an exemplary window 675 centered at point 670 in a region 680 that is delimited by boundary or edge 685. Center point 670 may be found or selected by utilizing a distance transform function ("DTF"). The DTF may calculate the distance of points (or pixels representing points) in region 680 from any edge of region 680. A point (or pixel) associated with a maximum of the transform function may be a point where the largest window may be centered and/or placed over pixels in region 680, but excluding edge pixels (e.g., pixels making up or lying or resenting an edge of the region). The maximal size of a window that may be placed in region 680 may be deduced by values produced by the DTF, as such values may reflect the distance of the center point of the window from edges of the region. Accordingly and as shown, window 675 may be the largest window that can be fitted into region 680. Another criterion that may be used to determine whether a window in a region (e.g., window 675 in region 680) is the largest possible, is to check overlapping between window points and edge/boundary point: if the window and the region's edges/boundary 'touch' in at least k (k=2, 3, 4, . . . ,) points, it may be determined that the window is the maximum possible and, therefore, it cannot be enlarged any further.

Figure 7:
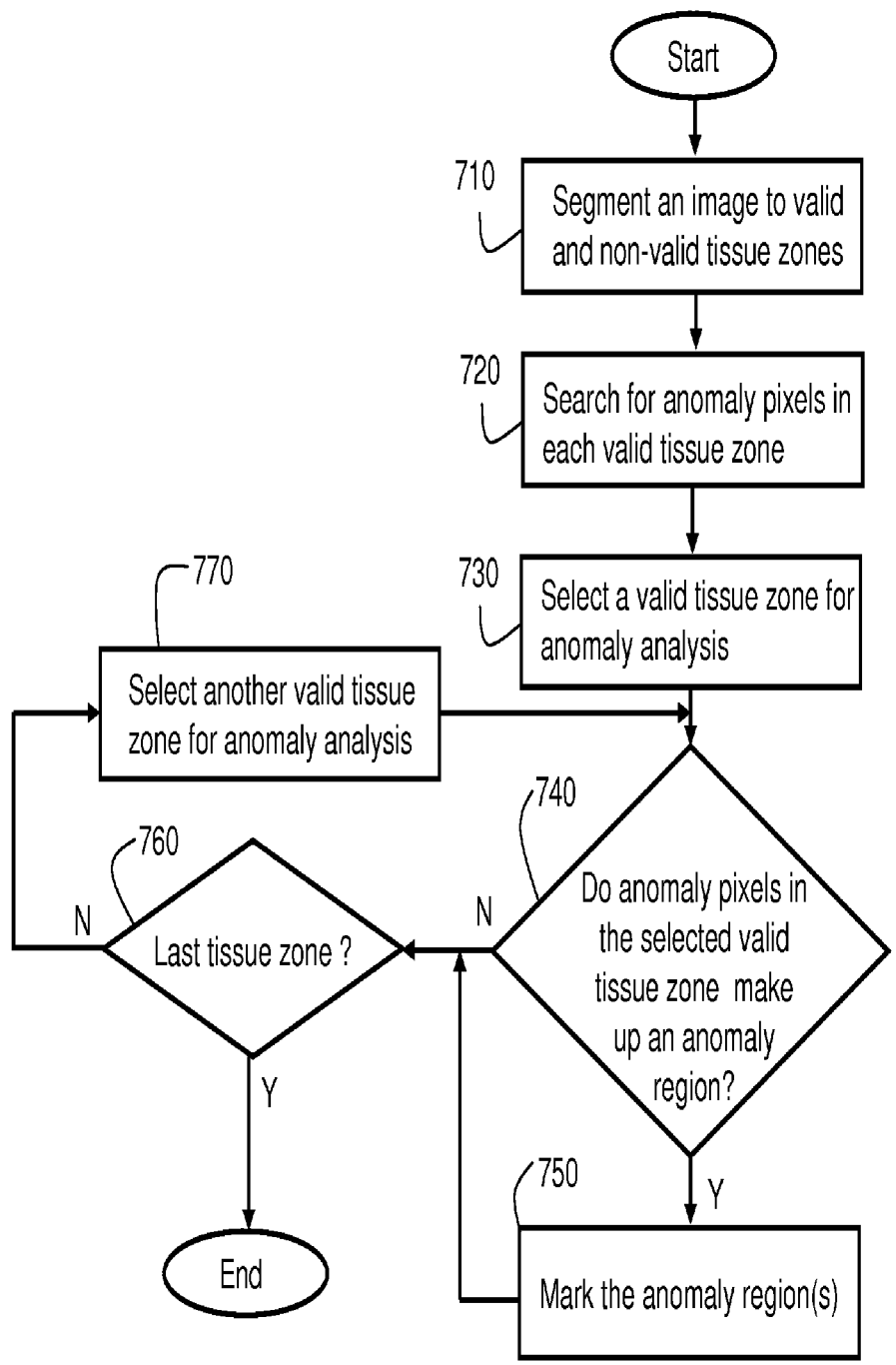
FIG. 7 shows a method for detecting anomalies according to an example embodiment.

FIG. 7 shows a method for detecting anomalies in imaged tissues according to an example embodiment. At operation 710, an image that may potentially include one or more anomalies is segmented (e.g., by TSU 220) to valid tissue zones and to non-valid tissue zones. The segmentation may be performed based on intensity or gray values of the pixels representing or making up the image. At operation 720, anomaly pixels are searched for (e.g., by ADU 250) in the entire color image. Anomaly pixels may be identified in the image by comparing their color characteristics to reference color characteristics (Dn-1, shown at 242 in FIG. 2), as described herein.

Pixels identified (e.g., by ADU 250) as anomaly pixels may be marked as such and stored (e.g., in memory unit 240) for further processing. At operation 730, a valid tissue zone is selected (e.g., by ADU 250) for anomaly analysis in order to determine (e.g., by ADU 250), at operation 740, whether its anomaly pixels, if exist, constitute or make up an anomaly region. If the first valid tissue zone contains anomaly pixels that constitute or make up an anomaly region (shown as "Y" at operation 740), the anomaly region may be noted or marked in operation 750 (e.g., by ADU 250) as such for future reference (e.g., display, etc.). However, if the anomaly pixels contained in the first valid tissue zone do not constitute or make up an anomaly region (shown as "N" at operation 740), it is checked, at operation 760, whether the valid tissue zone is the last valid tissue zone. If the valid tissue zone is the last valid tissue zone (shown as "Y" at operation 760), the anomaly detection/analysis may be terminated. However, if the valid tissue zone is not the last valid tissue zone (shown as "N" at operation 760), then at operation 770 another valid tissue zone is selected and undergo anomaly analysis (at operation 740). Steps 740, 760 and 770 may likewise be repeated or iterated for every valid tissue zone.

If an anomaly was detected, then information related to an indication to be provided to a user may be recorded or updated. For example, a frame number or time stamp may be recorded, etc. Alternatively, an indication to a user may be provided substantially immediately upon detecting an anomaly. Updating results or reporting upon termination may include any relevant task. For example, ADU 250 may update and maintain a list of images/frames in which anomaly was detected, the list may be updated, e.g., to indicate a frame number, a time parameter (e.g., the elapsed time from the capturing a first frame in a video stream to the capturing of a specific frame) or any other parameter or reference. A result may be a list of frames where an anomaly was detected or suspected. A list of frames may be provided to a physician, e.g., on a monitor, thus eliminating the need to spend time watching an entire video stream (that may be very long) in search of anomalies. Rather, the physician may be provided with selected frames (according to a list) and only examine selected frames. Updating anomaly results may include presenting or updating a presentation of results on a display screen, e.g., marking a detected anomaly.

Figure 8:
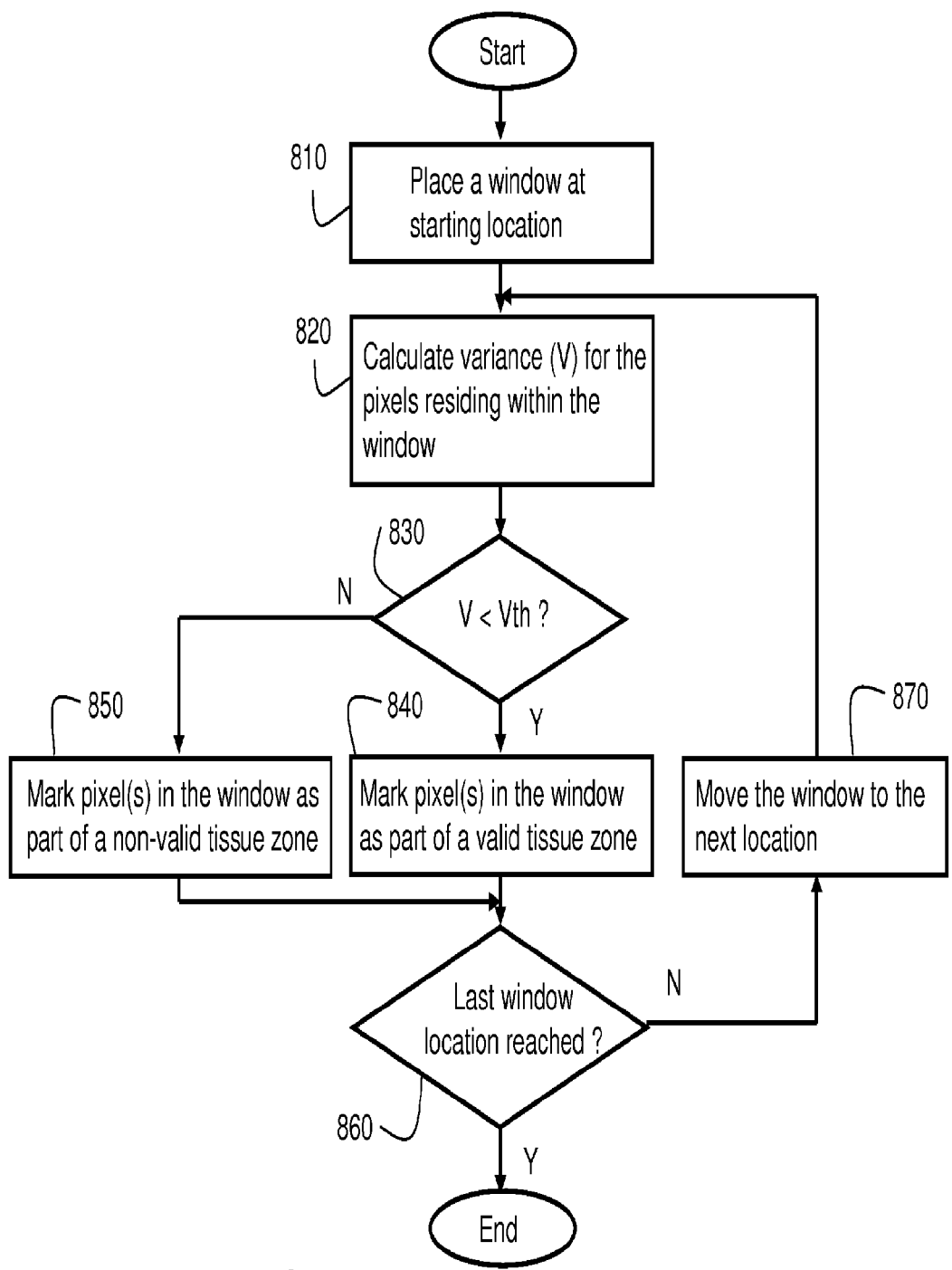
FIG. 8 shows a method for segmenting an image according to an example embodiment.

FIG. 8 is a method for segmenting an image to valid and non-valid tissue zones, according to an example embodiment. At operation 810, a window such as a slidable window may be used to define an area of an image for processing. For example the window may be conceptually initially placed or applied (e.g., by TSU 220) at a starting location in an image to be segmented (e.g., at a corner of the image). At operation 820, a variance (V) is calculated for intensities or gray levels of the entire or selected pixels residing in the window. At operation 830 the variance is compared to a variance threshold, Vth: if V<Vth (shown as "Y" at operation 830), this means that there are no abrupt changes in the gray levels of the pixels residing in the window. Therefore, at operation 840, the pixel, or pixels, residing in the center of the window may be marked as belonging to a valid tissue zone. However, if V is equal to or greater than Vth (shown as "N" at operation 830), this means that there are abrupt changes in the gray levels of the pixels residing in the window, and such changes may be attributed to a boundary or edge, wrinkle, shadow, etc., and, therefore, to a non-valid tissue zone. Therefore, at operation 850, the pixel, or pixels, residing in the center of the window may be marked as belonging to a non-valid tissue zone.

At operation 860, it is checked whether the slidable window is in the last location in the image. If it has reached the last location in the image (shown as "Y" at operation 860), the segmentation process may be terminated. However, if the slidable window has not reached last location in the image (shown as "N" at operation 860), the window is moved or slid to a next location (at operation 870) and steps 820, 830, etc., are repeated or iterated with respect to the new location. By using the segmentation process described above, each, or most, of the pixels making up the image are categorized as either belonging to valid tissue zone(s) or to non-valid tissue zone(s).

One way for segmenting an image is described below. A fixed-size window may virtually conceptually be slid across the original color image, and a variance in the gray level of the pixels circumscribed by the window may be calculated every time for the set of pixels contained within the window, thus obtaining a series of variances (e.g., a variance for each location of the window). The sliding window may be moved (e.g., moved and re-applied) m (m=1, 2, 3, . . . , etc.) pixels each time to cover substantially all or most of the pixels of the color image. When the sliding window is moved from one location to another, there may be pixels overlapping; that is, some pixels may still reside within the window after the window is moved one or more steps further, but placing the window in a next location always covers also new pixels. In some embodiments an actual virtual window need not be used; rather different regions may be examined, the regions being defined for explanatory purposes by a window.

A window such as a sliding window or another construct defining an area (e.g., a border) may be applied to images used to analyze images. A window may be a two dimensional shape, e.g., a square or rectangle, that may be associated with or applied to (e.g., virtually, by a processor) a portion or region of an image, or used to define an area of an image for processing. A sliding window may be another construct, such as a border, not necessarily geometric or not necessarily square, associated with or defining a region. By associating a window with an image or region, it is meant that the area defined by overlaying the window on the image or region is the area of interest. A sliding window may be a window or another construct surrounding, circumscribing or defining an area that may be translated or shifted with respect to the image or region and calculating, observing and recording parameters may be performed for each or some of the locations of the sliding window. A sliding window or other window used by a processor herein is typically not a physical window as is window or dome 160.

Referring again to FIG. 2, TSU 220 may slide a window across image Jn to calculate a series of variances, and determine, based on the series of variances, which pixel(s) are to be categorized as anomaly pixel(s) and which pixel(s) are to be categorized as normal pixels. For example, TSU 220 may calculate a variance for a particular group of N pixels that are circumscribed by a sliding window at a particular location, by calculating an average intensity value for that group of N pixels, as per formula (3), $$\text{Average} = \frac{1}{N} \sum_{i=1}^{N} \log I_i \qquad (3)$$

where $I_i$ is a light intensity of pixel i (i=1, 2, . . . , N) in the set of N pixels (other formulas may be used to calculate other types of averages; e.g., weighed average, etc.), and then calculating the variance for that group of N pixels by using the average intensity value, as per formula (4):

$$\text{Variance} = \frac{1}{N} \sum_{i}^{N} |\log I_i - Av| \qquad (4)$$

Regarding a particular group of N pixels that are located at a particular location in the image corresponding to the location of the sliding window, if the variance calculated for this group of pixels is smaller than a predetermined reference value, it may be assumed that the image portion corresponding to, or represented or imaged by, the particular group of N pixels does not contain boundaries, shadows, wrinkles, etc. Therefore, it may be determined (e.g., by TSU 220) that a subgroup of (e.g., 1, 2, 3, etc.) pixels located, for example, at the center of the pertinent window may be regarded as pixels belonging to a valid tissue zone. A determination regarding whether a particular pixel belongs to a valid tissue zone may be made only if the pixel's location substantially overlaps one of the varying window centers. (As the window is moved from one location to another, the 2-dimensional coordinates of its center change. Therefore, the window may be thought of as having multiple centers.)

Figure 9:
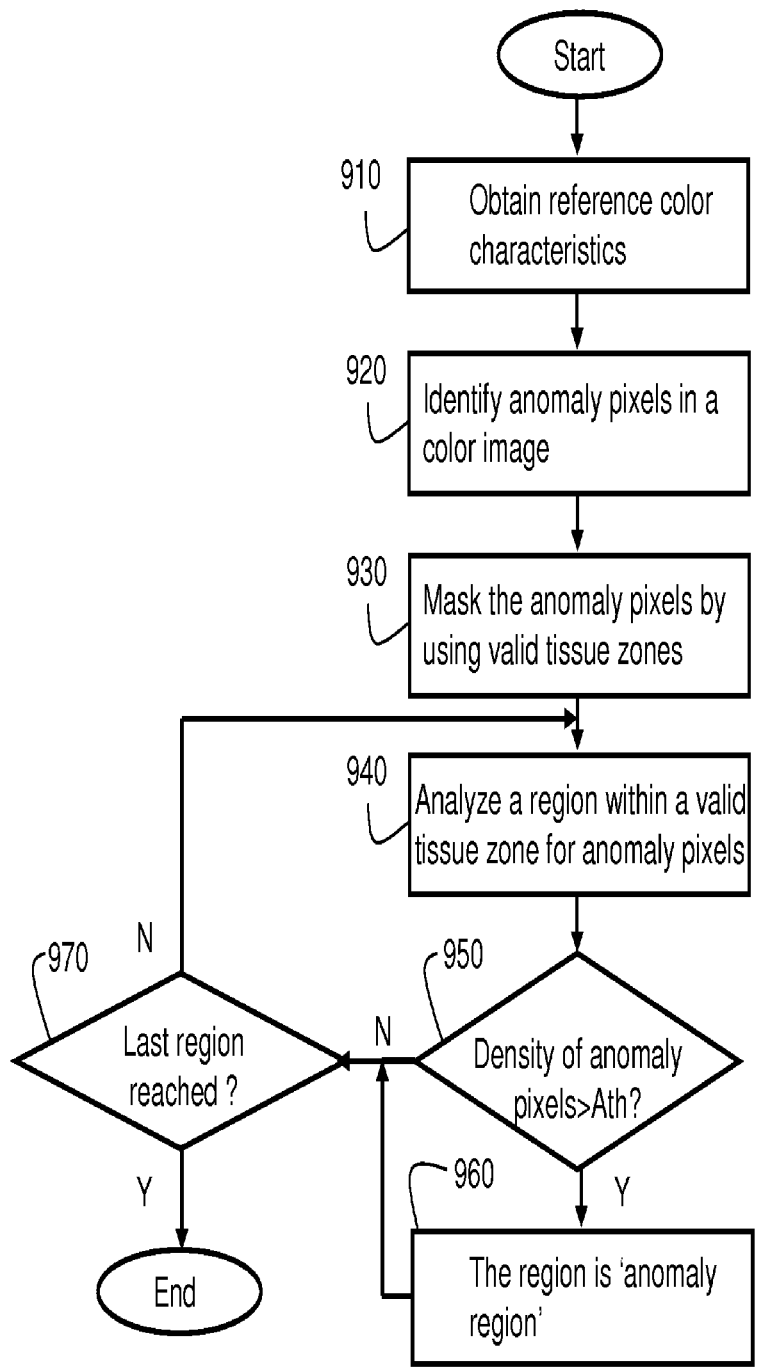
FIG. 9 shows a method for identifying an anomaly region according to an example embodiment.

FIG. 9 depicts a method for individually classifying pixels either as anomaly pixels or normal pixels according to one embodiment. At operation 910, reference color characteristics (e.g., Dn−1, see FIG. 2) are obtained as discussed above. At operation 920, color properties of pixels of the color image are compared to the reference color characteristics, as discussed above, in order to identify anomaly pixels. As explained above, an anomaly pixel may overlap an edge or boundary of a valid tissue zone. However, such anomaly pixels are filtered out, at operation 930, by masking all the anomaly pixels of the image with valid tissue zones. In other words, only anomaly pixels that reside in valid tissue zones are taken into account. At operation 940, a region within a particular valid tissue zone, which contains anomaly pixels, is analyzed in order to determine whether the region is an anomaly region. At operation 950, it is checked, as per the analysis in operation 940, whether the density of the anomaly pixels within the region is greater than a threshold value, Ath. If the density of the anomaly pixels within the region is greater than the threshold value Ath (shown as "Y" at operation 950), the region may be marked as anomaly region (operation 960). However, if the density of the anomaly pixels within the region is not greater than the threshold value Ath (shown as "N" at operation 950), the region is not marked as anomaly region and, at operation 970, it is checked whether the checked region is the last region of the valid tissue. If the checked region is the last region of the valid tissue (shown as "Y" at operation 970), the anomaly detection process, with respect to the particular valid tissue zone, is terminated. However, if the checked region is not the last region of the particular valid tissue (shown as "N" at operation 970) or if there is a next region, the next region is analyzed at operation 940, and operation 950 and 970 may likewise be repeated or iterated for other valid tissue zones, regions, or groups of pixels.

Figure 10:
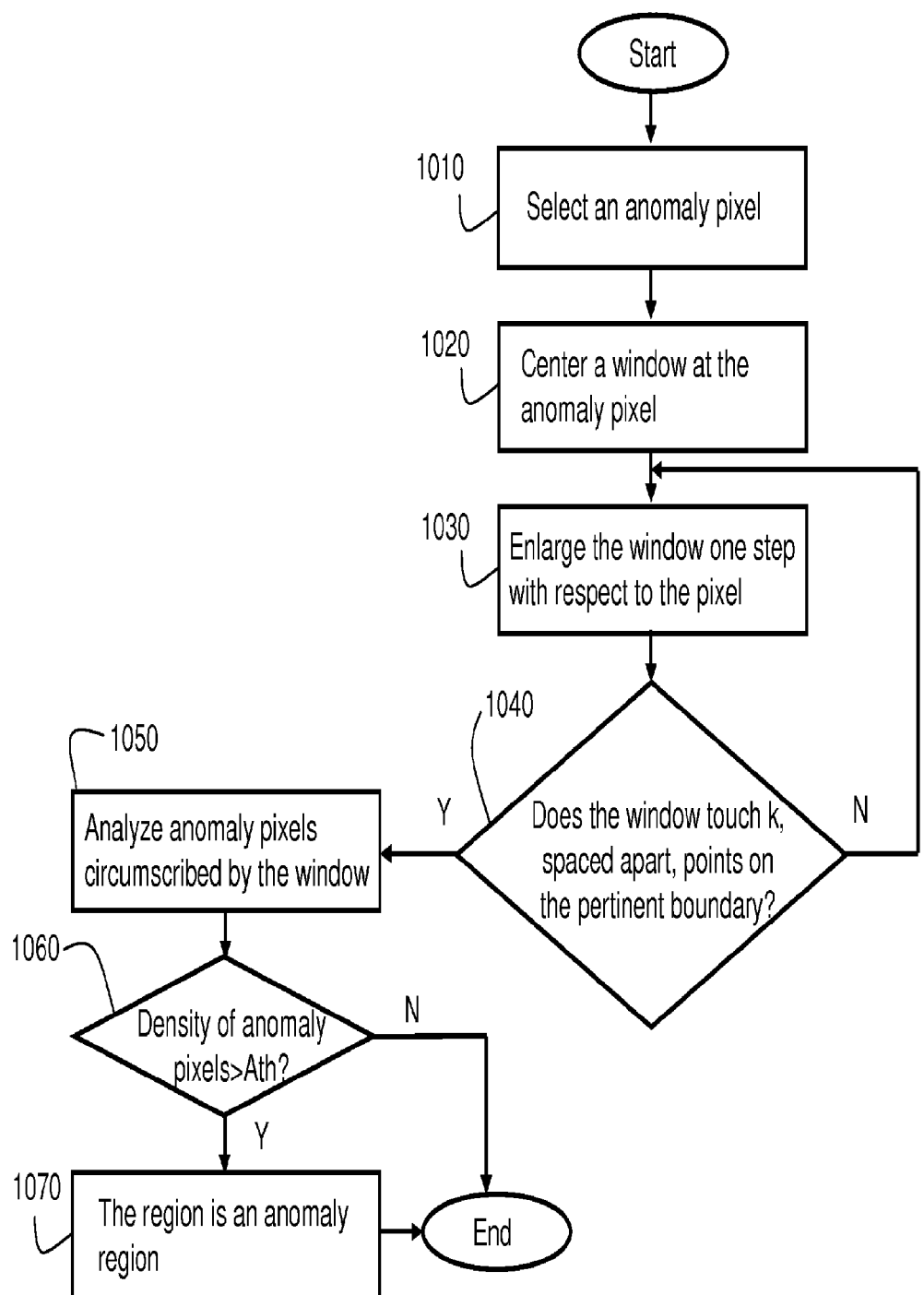
FIG. 10 shows a method for determining the size and location of an anomaly region according to an example embodiment.

FIG. 10 shows a method for defining and analyzing regions of anomaly pixels according to an example embodiment. At operation 1010, an anomaly pixel is selected, and at operation 1020 an adaptive window is centered at that pixel. At operation 1030, the adaptive window is stepwise enlarged one step, and at operation 1040 it is checked whether the adaptive window touches at least k (k=2, 3, 4, . . . ,) spaced apart points on the boundary or edges of the region. If the adaptive window does not touch at least k points on the boundary or edges of the region (shown as "N" at operation 1040), the window is enlarged one more step, at operation 1030. However, if the adaptive window touches at least k points on the boundary or edges of the region (shown as "Y" at operation 1040), this means that the adaptive window has reached its maximum size. Therefore, the anomaly 'content' of the window is analyzed, at operation 1050, to determine, at operation 1060, whether the density of the anomaly pixels circumscribed by the window is greater than the anomaly threshold, Ath. If it is determined at operation 1060 that the density of the anomaly pixels circumscribed by the window is greater than the anomaly threshold Ath (shown as "Y" at operation 1060), the entire region may be marked as an anomaly region (operation 1070). If it is determined at operation 1060 that the density of the anomaly pixels circumscribed by the window is not greater than the anomaly threshold Ath (shown as "N" at operation 1060), this means that the anomaly pixels in that region are only sporadic, for which reason no decisive determination can be made regarding abnormality of the tissue at that particular region.

The process shown in FIG. 10 may likewise be repeated or iterated for other anomaly pixels or groups of pixels. The pixel used as the window's center may be associated with, or selected based on or derived from a maximal value of a distance transform function (DTF), and the window may define a sub-region around the selected pixel. For example, a DTF may be applied to pixels and may produce a result or value that may be recorded in association with the pixel. The value may represent or be related to the smallest distance of a pixel from surrounding edges of a uniform region. An adaptive window may be associated with a region to define a sub-region. The center of the adaptive size window may be selected to coincide with a pixel associated with a maximum value of the distance transform function. The size, shape and/or orientation of the adaptive size window may be determined based on the recorded distances and other parameters related to the pixel. Accordingly, a DTF may be used to find a point in a region (e.g., a uniform region) at which a maximal window (or sub-region), which does not include any of the edges of the region, may be centered. A DTF may associate a point or a pixel with a value reflecting the pixel's distance from edges of the region. Accordingly, by determining a maxima of the DTF, a point or pixel with the greatest distance from surrounding edges may be identified. A window centered around such point may be the largest possible window (or sub-region) that fits in the region yet excludes the region's edges.

A set of DTF values may be examined to determine or detect one or more maxima, pixels associated with maxima may be selected as centers of an adaptive size window or another construct (e.g. a border) defining a sub-region. An adaptive size window may be defined or placed around the selected pixels. As a selected pixel may be associated with a maximum value (e.g., a local or global maximum compared to neighboring pixels) of the distance transform function, a set of adaptive size windows (or sub-regions defined by the set of adaptive size windows) located and determined as described herein may cover an entire, or most of, a uniform region.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. For example, a system may include a non-transitory storage medium such as memory 620, computer-executable instructions such as anomaly detector 625 and a controller such as controller 605. Some embodiments may be provided in a computer program product that may include a non-transitory machine-readable medium, having stored thereon instructions, which may be used to program a computer, or other programmable devices, to perform methods as disclosed above.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method of detecting an anomaly in an image captured in vivo by an in-vivo imaging system, the method comprising:
    segmenting an image captured in vivo into valid tissue zones for anomaly detection, and non-valid tissue zones excluded from anomaly detection, wherein each valid tissue zone is a portion of the image, wherein each pixel in the valid tissue zone has a pixel intensity value that is greater than a predetermined intensity reference value, and wherein each pixel in the valid tissue zone is associated with a respective set of imaging parameter values, the set of imaging parameter values having a deviation from a corresponding reference value no greater than a predefined deviation;
    identifying, in the valid tissue zones, individual pixels whose color characteristics deviate from reference color parameters representing normal tissue, and classifying said pixels as anomaly pixels; and
    analyzing each identified valid tissue zone by:
        (i) identifying a group of the individual anomaly pixels in the valid tissue zone;
        (ii) if the group of anomaly pixels in the valid tissue zone satisfies predetermined anomaly criteria, determining that a region of the zone containing the group of anomaly pixels is an anomaly region; and
    repeating steps (i) and (ii) for all anomaly pixels identified in the valid tissue zone.

2. The method as in claim 1, wherein a valid tissue zone is identified by identifying pixels of the valid tissue zone, wherein identifying such a pixel comprises:
    sliding a window to a location in the image;
    calculating a variance of intensity levels of the pixels residing within the pixels circumscribed by the window; and
    if the variance is smaller than an intensity reference, determining that the pixel belongs to the valid tissue zone.

3. The method as in claim 1, wherein identifying the group of anomaly pixels in the valid tissue zone comprises adapting a window to the group of anomaly pixels by using a distance transform function.

4. The method as in claim 1, wherein the in-vivo imaging system captures a series of images of the tissue, and wherein the reference color parameters are associated with a normal tissue and determined adaptively based on at least some of the images.

5. The method as in claim 4, wherein the reference color parameters are determined based on a range of color characteristics, the range being determined based on a statistical calculation related to an imaging parameter values observed in the set of images.

6. The method as in claim 1, wherein the imaging system is a swallowable capsule.

7. The method of claim 1, wherein the tissue to be examined is selected based on an indication of interest provided by a user.

8. The method of claim 1, wherein the anomaly is related to any of: a polyp, a lesion, a tumor, a blood spot, an angiodysplasia, an ulcer, a cyst, a choristoma, a hamartoma, a tissue malformation and a nodule.

9. The method of claim 1, further comprising indicating the detection of the anomaly on a display screen.

10. The method of claim 1, wherein the color characteristics are selected from the group consisting of: intensity, hue, brightness, luminance, chromaticity, and saturation.

11. The method of claim 1, further comprising displaying to a user a visual indication related to a detection of an anomaly.

12. A system for detecting anomalies in an image captured in vivo by an in-vivo imaging system, the system comprising:
a workstation comprising a memory and a processor, the memory to store an image captured by the in-vivo imaging system, and the processor to:
segment an image captured in vivo into valid tissue zones for anomaly detection, and non-valid tissue zones excluded from anomaly detection, wherein each valid tissue zone is a portion of the image, wherein each pixel in the valid tissue zone has a pixel intensity value that is greater than a predetermined intensity reference value, and wherein each pixel in the valid tissue zone is associated with a respective set of imaging parameter values, the set of imaging parameter values having a deviation from a corresponding reference value no greater than a predefined deviation;
identify, in the valid tissue zones, individual pixels whose color characteristics deviate from reference color parameters representing normal tissue, and
classifying said pixels as anomaly pixels; and
analyze each identified valid tissue zone by:
(i) identifying a group of the individual anomaly pixels in the valid tissue zone;
(ii) if the group of anomaly pixels in the valid tissue zone satisfies predetermined anomaly criteria, determining that a region of the zone containing the group of anomaly pixels is an anomaly region; and
repeating steps (i) and (ii) for all anomaly pixels identified in the valid tissue zone.

13. A system for detecting anomalies in an image captured in vivo by an in-vivo imaging system, the system comprising:
a workstation comprising a memory and a processor, the memory to store an image captured by the in-vivo imaging system, and the processor to:
determine, for at least a subset of the pixels in the image, if an associated imaging parameter value is indicative of an anomaly by comparing the associated imaging parameter value to a reference value;
define a uniform region in the image by identifying a set of pixels associated with a respective set of imaging parameter values, the set of imaging parameter values having a deviation from the reference value no greater than a predefined deviation;
define a sub-region in the uniform region; and
if a predefined portion of pixels included in the sub-region is associated with an imaging parameter value indicative of an anomaly as determined in the determining operation, then determine an anomaly is present in a tissue segment associated with the sub-region, wherein
the in-vivo imaging system captures a set of images of the tissue and wherein the reference value is associated with a normal tissue and is determined adaptively based on at least a subset of the captured set of images.

14. The system of claim 13, wherein defining the uniform region comprises:
associating a sliding window with a plurality of locations in the image;
determining a deviation average value calculated for each of the locations is below the predefined value; and
defining the uniform region based on the plurality of locations.

15. The system of claim 13, wherein defining the sub-region in the uniform region comprises:
calculating a distance transform function value for at least some pixels associated with the uniform region, wherein a distance transform function value associated with a pixel is related to the minimal distance of the location of the pixel from a location of a border of the uniform region;
examining a set of distance transform function values associated with a respective set of pixels;
selecting a pixel associated with a maximum value of the distance transform function; and
defining the sub-region by defining an adaptive size window centered at the selected pixel, wherein the size of the adaptive size window is based on a value associated with the selected pixel by the distance transform function and wherein the adaptive size window defines the border of the sub-region.

16. The system of claim 15, wherein the reference value is determined based on a range of the imaging parameter values, the range determined based on a statistical calculation related to an imaging parameter values observed in the set of images.

17. The system of claim 13, wherein the imaging system is a swallowable capsule.

18. The system of claim 13, wherein the tissue is selected based on an indication of interest provided by a user.

19. The system of claim 13, wherein the anomaly is related to one of: a polyp, a lesion, a tumor, a blood spot, an angiodysplasia, a cyst, a choristoma, a hamartoma, a tissue malformation and a nodule.

20. The system of claim 13, comprising indicating a detection of the anomaly on a display screen.

21. The system of claim 13, wherein the imaging parameter is selected from the group consisting of: an intensity, a hue, a brightness, a luminance, a chromaticity and a saturation.

22. The system of claim 13, wherein the processor is configured to display to a user a visual indication related to a detection of an anomaly.

23. The system of claim 13, wherein defining a uniform region in the image comprises:
calculating an average value based on a plurality of values of an imaging parameter associated with a respective plurality of pixels in a region associated with a selected pixel,
calculating, for each of the plurality of pixels, a deviation of an associated imaging parameter value from the average value to produce a set of deviation values,
calculating a deviation average value by calculating an average value of the set of deviation values, and
including the selected pixel in the uniform region if the deviation average value is below a predefined value.

* * * * *